June 21, 1927.

J. G. WHITLOW

VALVE PIN EXTRACTOR

Filed Feb. 7, 1923

1,633,237

Inventor
J. G. Whitlow

By D. Swift

Attorney

Patented June 21, 1927.

1,633,237

UNITED STATES PATENT OFFICE.

JAMES G. WHITLOW, OF CORNELIUS, NORTH CAROLINA.

VALVE-PIN EXTRACTOR.

Application filed February 7, 1923. Serial No. 617,501.

The invention relates to valve pin extractors, and has for its object to provide a device of this character, which is particularly adapted for pulling valve pins, however it could be used for pulling cotter pins or pins of any character. The device comprises pivoted jaws for gripping a pin, said jaws being normally held within a socket by means of a spring and adjacent hand grips whereby the pivoted jaws may be forced outwardly against the action of the spring.

A further object is to provide a pin extractor which is elongated, thereby allowing the device to be easily positioned for remov15 ing pins and cotter pins from positions where ordinary tools, such as pliers cannot reach them on account of adjacent mechanism.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
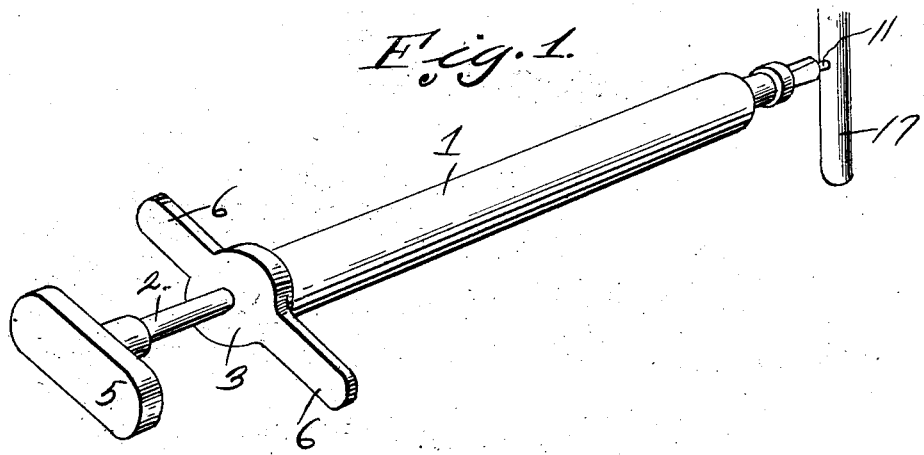
Figure 1 is a perspective view of the pin extractor showing the same in position for use.
Figure 2:
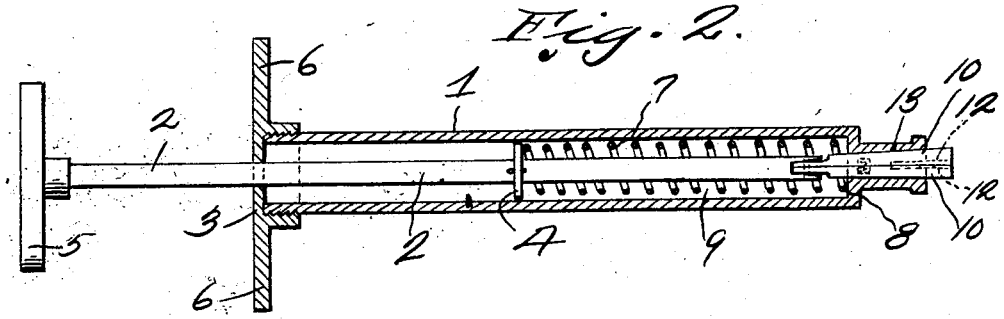
Figure 2 is a longitudinal sectional view through the device.
Figure 3:
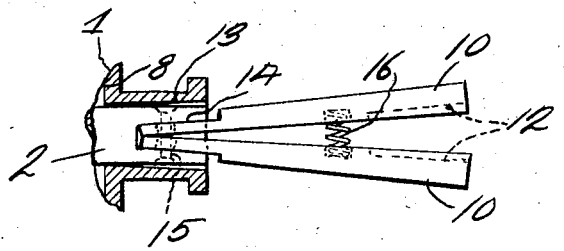
Figure 3 is a detail sectional view of the outer end of the device showing the pin receiving jaws in outer position and ready to grip an object.

Referring to the drawing, the numeral 1 designates a cylindrical member, in which member is slidably mounted for axial movement, a shaft 2. The shaft 2 has a bearing in the cap 3, and is provided with a disc 4, which is slidably mounted within the cylindrical member. It will be seen that when the operator places the palm engaging member 5 carried by the shaft 2, within the palm of the hand, and grasps the finger engaging members 6 carried by the cap 3, that the shaft 2 may be forced inwardly against the action of the coiled spring 7, or allowed to move outwardly under the influence of the coiled spring 7. The coiled spring 7 is interposed between the disc 4 and the bottom 8 of the chamber 9 of the cylindrical member 1, and surrounds the shaft 2. As soon as the palm engaging member 5 is released by the operator, the coiled spring 7 expands, thereby forcing the tapered jaws 10, which grasp a pin 11 in the grooves 12 thereof inwardly through the tapered opening 13 carried by the outer end of the body member 1, and consequently securely jams the members 10 into gripping engagement with the pin and holds the same. The gripping members 10 are loosely mounted in a bifurcation 14 in the end of the shaft 2 and loosely mounted on a pin 15, which extends across said bifurcation, therefore, it will be seen that when the members are forced outwardly, they will be forced apart for receiving a pin by the coiled spring 16, thereby insuring the proper opening of the members 10. When the palm engaging member 5 is released, the spring 7 immediately expands and forces the pin engaging members 10 inwardly where they will grip the pin and hold the same, after which the pin may be pulled from its position in a valve stem 17 by the operator gripping the palm engaging member 5 and pulling on the same.

From the above it will be seen that a pin extractor is provided, which is simple in construction, positive in its operation, and one wherein a pin will be positively gripped and held in such a manner that it may be easily and quickly moved from its position.

The invention having been set forth what is claimed as new and useful is:—

A pin extractor comprising a cylinder a shaft slidably mounted in said cylinder, a reduced extension carried by one end of said cylinder and having a tapered bore therein, gripping jaws disposed in said tapered bore and cooperating with said tapered bore when moved therein by the shaft, a spreader spring between said tapered jaws, said tapered jaws being segmentally shaped in transverse cross section, the inner ends of said jaws having flattened reduced portions, spaced arms carried by the shaft and between which the reduced portions of the jaws are disposed, said reduced portion of the jaws being disposed between said arms, a pin extending through the arms of the shaft and on which the jaws are pivotally mounted, said shaft arms upon extreme outer movement of the shaft and jaws cooperating with the outer sides of the reduced portions of the jaws whereby the spreading apart of the jaws is limited when said jaws are in extreme outer position.

In testimony whereof I have signed my name to this specification.

JAMES G. WHITLOW.